United States Patent
Vankipuram et al.

(10) Patent No.: US 12,196,953 B2
(45) Date of Patent: Jan. 14, 2025

(54) EYE MOVEMENT CONTROLS IN EXTENDED REALITY

(71) Applicant: Hewlett-Packard Development Company, L.P., Spring, TX (US)

(72) Inventors: Mithra Vankipuram, Palo Alto, CA (US); Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 390 days.

(21) Appl. No.: 17/415,016

(22) PCT Filed: Jun. 7, 2019

(86) PCT No.: PCT/US2019/036026
§ 371 (c)(1),
(2) Date: Jun. 17, 2021

(87) PCT Pub. No.: WO2020/246986
PCT Pub. Date: Dec. 10, 2020

(65) Prior Publication Data
US 2022/0128813 A1 Apr. 28, 2022

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0138* (2013.01)

(58) Field of Classification Search
CPC ............ G02B 27/0093; G02B 27/0172; G02B 2027/0138
See application file for complete search history.

(56) References Cited

U.S. PATENT DOCUMENTS

| | | |
|---|---|---|
| 2009/0326406 A1 | 12/2009 | Tan et al. |
| 2013/0342564 A1 | 12/2013 | Kinnebrew et al. |
| 2016/0026253 A1 | 1/2016 | Bradski et al. |

(Continued)

FOREIGN PATENT DOCUMENTS

| | | |
|---|---|---|
| CN | 106406537 | 2/2017 |
| CN | 106951316 | 7/2017 |
| CN | 107507280 | 12/2017 |

(Continued)

OTHER PUBLICATIONS

Abe, Ki yohi ko et al. "Input Interface Using Eye-Gaze and Voluntary Blink (Japanese Title: ). " IEEJ Transactions on Electronics, Information and Systens 136 ( 2016) : 1185-1193. Available at: https: //www researchgate. net / publ i cat i on/ 305762267 Input Interface Using Eye-Gaze and vol. untary Blink.

(Continued)

*Primary Examiner* — Ryan D Howard
(74) *Attorney, Agent, or Firm* — Quarles & Brady LLP (57) ABSTRACT

In example implementations, an apparatus is provided. The apparatus includes a display, an eye tracking sensor, and a processor. The eye tracking sensor is to capture eye movements of a user. The processor is in communication with the display and the eye tracking sensor. The processor is to identify a type of eye movement from the eye movements captured by the eye tracking sensor and activate a control that is shown in the display.

16 Claims, 5 Drawing Sheets

(56) References Cited

U.S. PATENT DOCUMENTS

2017/0091535 A1\* 3/2017 Yu .................. G06V 40/176
2017/0263006 A1 9/2017 Hunt et al.

FOREIGN PATENT DOCUMENTS

CN 109618200 4/2019
WO WO-2018218086 A1 \* 11/2018 ........... A61B 5/0488

OTHER PUBLICATIONS

Alias, Norma et al., "Embedded system on high performance data for wearable augmented reality of eye blinks, muscle stress detection movement and observation." Jan. 2018. International Journal of Engineering and Technology, vol. 7, No. 4, pp. 3263-3267.
Królak, Aleksandra et al. "Eye-blink detection system for human-computer interaction." Universal Access in the Information Society 11, No. 4 (2012): 409-419. Available at: https://link.springer.com/article/10.1007/s10209-011-0256-6.
Langbehn, Eike et al., "In the Blink of an Eye—Leveraging Blink-Induced Suppression for Imperceptible Position and Orientation Redirection in Virtual Reality". ACM Trans. Graph., vol. 37, No. 4, Article 66. Publication Date: Aug. 2018.

\* cited by examiner

EYE MOVEMENT CONTROLS IN EXTENDED REALITY

BACKGROUND

Virtual reality (VR) applications provide new experiences for users. The VR applications can provide an artificial environment created via software. The VR systems may include a range of hardware. For example, the VR systems may include an entire enclosure where the user can feel movement as the enclosure moves, or head mounted displays (HMDs) that can be worn by the user.

DETAILED DESCRIPTION

Examples described herein provide a method and system to provide eye movement controls in extended reality applications. In one example, extended reality (XR) may be defined to include virtual reality (VR) devices and applications, augmented reality (AR) devices and applications, mixed reality (MR) devices and applications, and the like.

As discussed above, VR applications and equipment can provide an artificial environment for users that can provide a wide range of different experiences. In some instances, a user's hands and/or the user's voice may be engaged in another activity within the VR environment. For example, the user may be grasping something in the VR environment or conversing with another person in the VR environment. Thus, it may be inconvenient for the user to drop what they are doing in the VR environment to provide control inputs.

Examples herein provide a way to track eye movements of the user and allow the user to use eye movements as controls within the XR environment. For example, the XR HMD may include a sensor that can track eye movements. The eye movements can be translated into associated functional controls within the XR environment. Thus, using eye movements to control the XR environment may free the hands of the user to engage in other activities in the XR environment.

In one example, eye movements within the present disclosure may refer to the muscular movement around the eyeball. For example, eye movements within the present disclosure may include moving the eyelid, moving muscles around the eyeball when squinting, movement of the eyebrows, and the like. For example, eye movements of the present disclosure may include intentional blinking (as opposed to unintentional blinking discussed in further details below), winking, raising or lowering the eyebrows, intentional blinking for a particular duration of time, blinking a single eye, tracking a sequence of intentional blinks, and so forth.

The eye movements may be tracked to provide functional controls of the XR HMD. The functional controls may include toggling between a VR mode and an AR mode of the XR HMD, bringing up a menu, moving a cursor within the menu, making a menu selection, and the like. Thus, the present disclosure provides an additional way to provide XR controls by tracking eye movements of a user.

Figure 1:
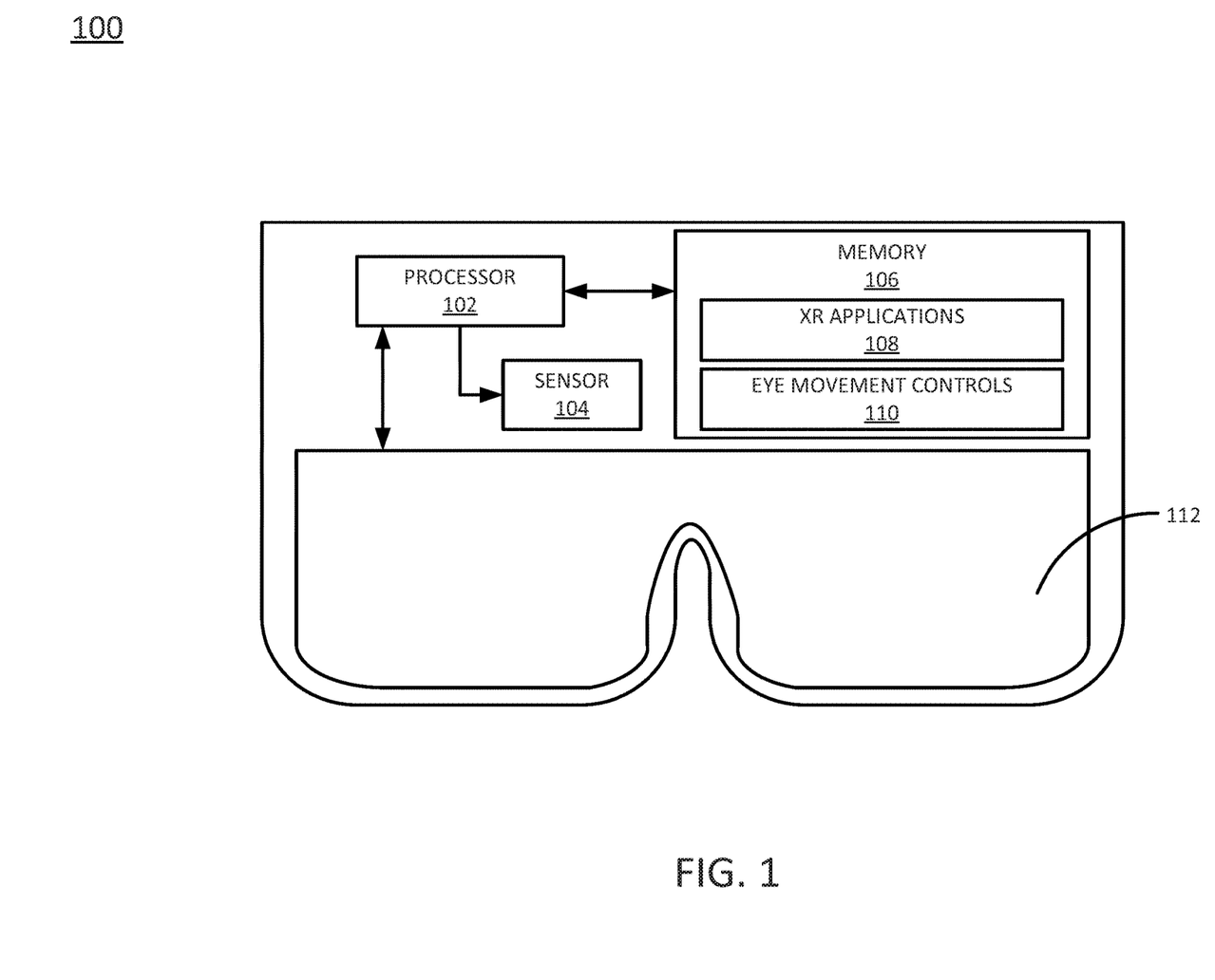
FIG. 1 is a block diagram of an example extended reality (XR) head mounted display (HMD) of the present disclosure.

FIG. 1 illustrates an example XR HMD 100 of the present disclosure. In one example, the XR HMD 100 may include a processor 102, a sensor 104, a memory 106, and a display 112. The processor 102 may be communicatively coupled to the sensor 104, the memory 106, and the display 112. The XR HMD 100 may be connected to other devices that may be part of a XR system. For example, the XR HMD 100 may also be communicatively coupled to XR controllers (not shown) that may be held in the user's hands.

It should be noted that the XR HMD 100 has been simplified for ease of explanation and may include additional devices and/or components that are not shown. For example, the XR HMD 100 may include haptic feedback modules, graphics processors, speakers, microphones, wireless communication interfaces, and the like.

In one example, the display 112 may be a pass-through display. For example, the display 112 may have a XR screen that acts as a normal display where a XR environment is shown to a user or may have an AR pass-through screen where XR elements can be mixed in with real objects that can be seen through the display 112. Thus, the XR HMD 100 can be used for both VR and AR applications and/or modes.

The memory 106 may include instructions executed by the processor 102. The instructions may be associated with XR applications 108. The XR applications 108 may include a variety of different VR simulations, AR simulations, MR simulations, VR/AR/MR games, VR/AR/MR environments, VR/AR/MR programs, and the like.

The memory 106 may also store eye movement controls 110. The eye movement controls 110 may be predefined and may be used to associate various controls for the XR applications 108 with detected eye movements of a user.

In one example, the sensor 104 may be an eye movement sensor that can detect the eye movements of the user. In one example, the eye movements of the user may be defined as intentional activation of various muscles around the orbital bone of the eyes of the user. In other words, the eye movements of the user are not intended to include the movement of the user's eyeballs and tracking a direction of gaze of the eyeballs of the user. Rather, the eye movements of the user are defined as intentional muscular movements such as a blink, a wink, closing the eyelids of one or both eyes of the user, raising the eyebrows of a user, lowering the eyebrows of the user, furrowing the eyebrows of the user, and the like.

In one example, the eye movements may include a series of eye movements. For example, the user may blink in a predefined pattern or sequence. For example, the user may blink for a predefined number of times (e.g., 3 consecutive intentional blinks), the user may close the left eye, then close the right eye, then blink with both eyes for a predefined time period, may blink rapidly for several seconds, may perform a pattern of eye brow raises and intentional blinks, and so forth.

In one example, the sensor 104 may be able to distinguish between intentional eye movements and unintentional eye movements. For example, the sensor 104 may be able to differentiate between an intentional blink and an unintentional blink. In one example, an intentional blink may cause activation of certain muscles around the orbital bone of the eyes of the user, e.g., those muscles associated with squeezing the eyelids closed. These muscles are not activated during an unintentional blink. In one example, an intentional blink may be when a user closes his or her eyelids for a predefined period of time (e.g., 2 seconds, 5 seconds, and the like).

In one example, the sensor 104 may capture eye movements of the user. The eye movements that are captured may be provided to the processor 102. The processor 102 may analyze the eye movements to identify a type of eye movement that was captured (e.g., an intentional blink, left eye blink, right eye blink, closing an eye for a predefined time period (e.g., greater than 5 seconds, an eyebrow raise, and the like). The identified eye movement may then be compared to the eye movement controls 110 and a control may be executed in the XR application 108 that is being executed.

For example, the sensor 104 may capture an eye movement and provide the eye movement to the processor 102. The processor 102 may determine that the eye movement is an intentional blink. The eye movement controls 110 may indicate that an intentional blink is associated with a VR/AR toggle control As a result, the processor 102 may control the display 112 to switch or toggle between a VR screen and an AR pass through screen.

Thus, the user may be able to toggle between a VR/AR mode of the XR HMD 100 using his or her eyes rather than trying to toggle a switch or button with user's hands. As noted above, the user may be holding controllers and may be holding an object in the XR environment or may be engaged in another activity that prevents the user from being able to use his or her hands. By providing the ability to detect an intentional blink, the user may be able to provide input controls, such as a VR/AR toggle for the display 112, without having to user his or her hands.

In one example, other eye movements can be used to provide other types of control inputs. For example, raising and lowering the eyebrows can be used to scroll up and down a menu, blinking for a predetermined amount of time may be used to display a menu on the display 112, blinking rapidly for 5 seconds can be used to restart the XR applications 108, closing a left eye or closing a right eye can be used to scroll left and right in a menu, blinking twice within a predefined period of time may be used to make a selection, and so forth. It should be noted that the combination of eye movements and controls are provided as examples and that the eye movements can be associated with other controls or different combinations of eye movements and controls may be possible.

In one example, the processor 102 may continuously monitor the eye movements captured by the sensor 104. In one example, the processor 102 may monitor the eye movements captured by the sensor 104 in a rolling time window. For example, the time window may be every 5 seconds, every 10 seconds, and the like.

In one example, eye movement control may be a selected mode that may be activated. For example, the user may start an XR application 108 where his or her hands will be busy engaging in various controls or activities within the XR application 108. Thus, the user may want to enable the eye movement control during the XR application 108.

Examples of activating the eye movement control may include the user closing his or her eyes for 10 seconds to enable an eye movement control that allows the sensor 104 to begin detecting eye movements and have the processor 102 begin monitoring the eye movements continuously or in a rolling time window. In one example, the eye movement control may be activated via voice command (e.g., the user may say "activate eye controls") or may be activated via a physical switch.

Figure 2:
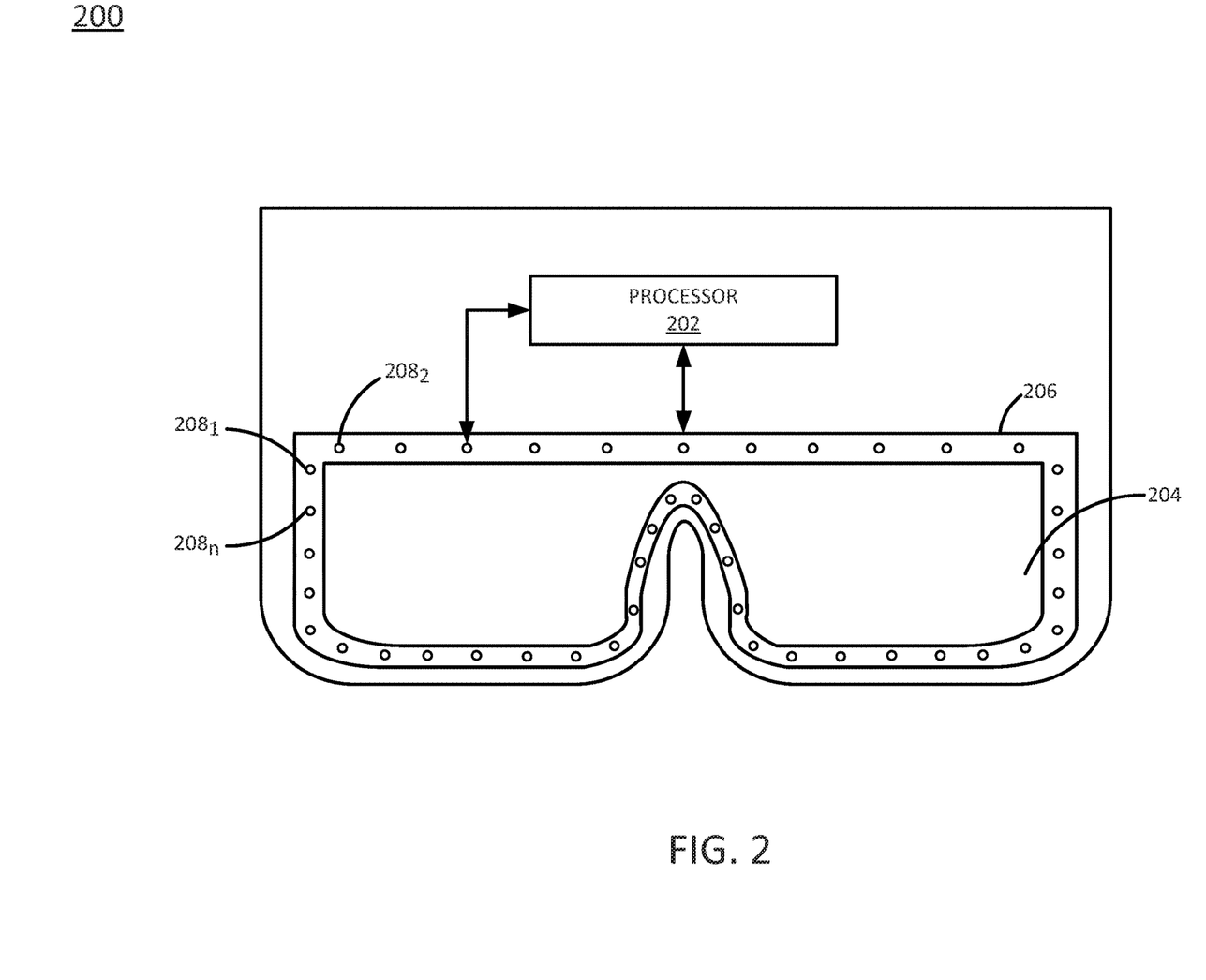
FIG. 2 is a block diagram of an example XR HMD that uses an electromyography (EMG) sensor to track movement of the eyes to control the XR environment of the present disclosure.

FIG. 2 illustrates an example XR HMD 200 that includes electromyography (EMG) sensors $208_1$ to $208_n$ (also referred to herein individually as an EMG sensor 208 or collectively as EMG sensors 208). In one example, a processor 202 may be communicatively coupled to the EMG sensors 208 and a display 204. The display 204 may also be a pass-through display that may allow the XR HMD 200 to operate in a VR mode or an AR mode. The XR HMD 200 may also include a memory that stores XR applications and eye movement controls similar to the memory 106 in the XR HMD 100, illustrated and described above.

In one example, the EMG sensors 208 may be located around a gasket 206. The gasket 206 may be a portion of the XR HMD 200 that contacts the face of the user when the XR HMD 200 is worn. The gasket 206 may be fabricated from a flexible material (e.g., a soft rubber, soft plastic, silicone, and the like) that may bend to the shape and contours of the face of the user.

In one example, the EMG sensors 208 may be deployed inside of the gasket 206 or on an outer surface of the gasket 206 to contact the face of the user. The EMG sensors 208 may be used to detect activation and/or movement of muscles around the eyes or orbital bones of the user's face. The EMG sensors 208 may use electrodes that can contact the skin and record information associated with muscle activity.

For example, the EMG sensors 208 may collect electrical potential signals (also known as electromyograms) generated by activation and/or movement of muscles. The electromyograms may be analyzed to detect when a user activates certain muscles that may be indicative of an intentional blink, moving an eyebrow, and the like. In contrast, the muscles that are activated for an intentional blink may not be activated during an unintentional blink.

For example, the EMG sensors 208 may record the electromyograms of the muscles around the eyes of the user. The electromyograms may be transmitted to the processor 202. The processor 202 may determine that the electromyograms are associated with an intentional blink. The intentional blink may be associated with a control to toggle between a VR mode and an AR mode. As a result, the processor 202 may cause the display 204 to switch between a VR screen and an AR pass-through screen, or vice versa. The EMG sensors 208 may be used to capture other eye movements, as described above, to perform other control inputs, as described above.

Although a plurality of EMG sensors 208 are illustrated in FIG. 2, it should be noted that there may be a single continuous sensor around the entire gasket 206. It should also be noted that the spacing of the EMG sensors 208 illustrated in FIG. 2 is shown as an example. The EMG sensors 208 may be placed more sporadically (e.g., one for each eye on a top side of the gasket 206 and one for each eye on a bottom side of the gasket 206, and so forth).

Figure 3:
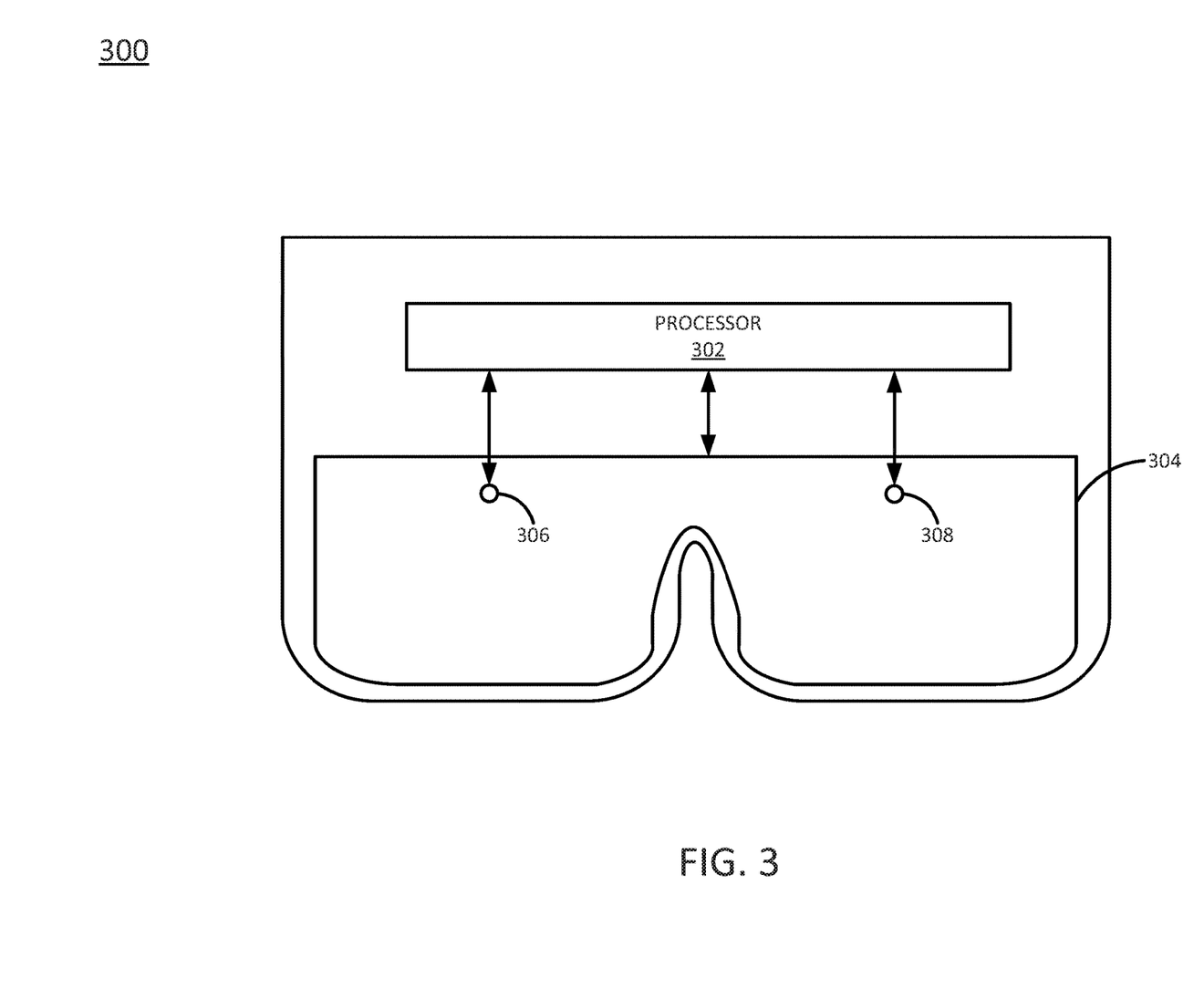
FIG. 3 is a block diagram of an example XR HMD that uses a camera to track movement of the eyes to control the XR environment of the present disclosure.

FIG. 3 illustrates another example of a XR HMD 300 that includes cameras 306 and 308 as the sensor 104. In one example, the processor 302 may be communicatively coupled to the cameras 306 and 308 and a display 304. The display 304 may also be a pass-through display that may allow the XR HMD 300 to operate in a VR mode or an AR mode. The XR HMD 300 may also include a memory that stores XR applications and eye movement controls similar to the memory 106 in the XR HMD 100, illustrated and described above.

In one example, the cameras 306 and 308 may be located in positions to capture eye movements. Although FIG. 3 illustrates the cameras 306 and 308 being located on a top side over each eye of the user, it should be noted that the cameras 306 and 308 may be located anywhere around or in the display 304.

In one example, the camera 306 and 308 may have a wide field of view. For example, the camera 306 and 308 may be located relatively close the face of the user when the user is wearing the XR HMD 300. As a result, to ensure that the cameras 306 and 308 can capture the movement of muscles around the orbital bone of the eyes and the eyebrows, the camera 306 and 308 may be wide angle cameras.

In one example, the cameras 306 and 308 may be red, green, blue (RGB) cameras to capture color images. The cameras 306 and 308 may be black and white cameras that can capture black and white images.

In one example, the cameras 306 and 308 may capture video images of portions of the areas around the eyes of the user. The video images may be provided to the processor 302 and analyzed to determine if certain muscles around the eyes of the user are activated. For example, the images may be compared frame by frame to determine if certain muscles are activated and to determine a type of eye movement.

Frame to frame analysis of the video images may be used to identify a type of eye movement. For example, an eyebrow raise may be seen from frame to frame when a user's eyebrow moves up or down. A blink, a wink, or closing of the eyelids may be seen from frame to frame by movement of the eyelids for a predetermined period of time.

In another example, certain areas that include an area known to have muscles that cause an intentional blink may be analyzed on a pixel level basis from frame to frame. For example, certain regions of the frame of video may be analyzed on a pixel by pixel basis to detect movement of the muscles for an intentional blink. For example, movement of the muscles may create a change in shadows or light in that can be detected on a pixel level to detect when the muscles are activated and to identify an intentional blink.

The identified type of eye movement may be used to provide an input control to the XR application. For example, the video images may be analyzed to determine that a user has intentionally blinked. The intentional blink may be associated with a VR/AR toggle. As a result, the processor 302 may change the display 304 from a VR screen to an AR pass-through screen, or vice versa.

In one example, to save power of the XR HMD 300, the cameras 306 and 308 may be turned on when the eye movement control is enabled or activated. As noted above, the eye movement control may be enabled or disabled by the user. Thus, FIGS. 2 and 3 illustrate different examples of sensors 104 that can be used in the XR HMD to detect eye movements to control a XR application.

Figure 4:
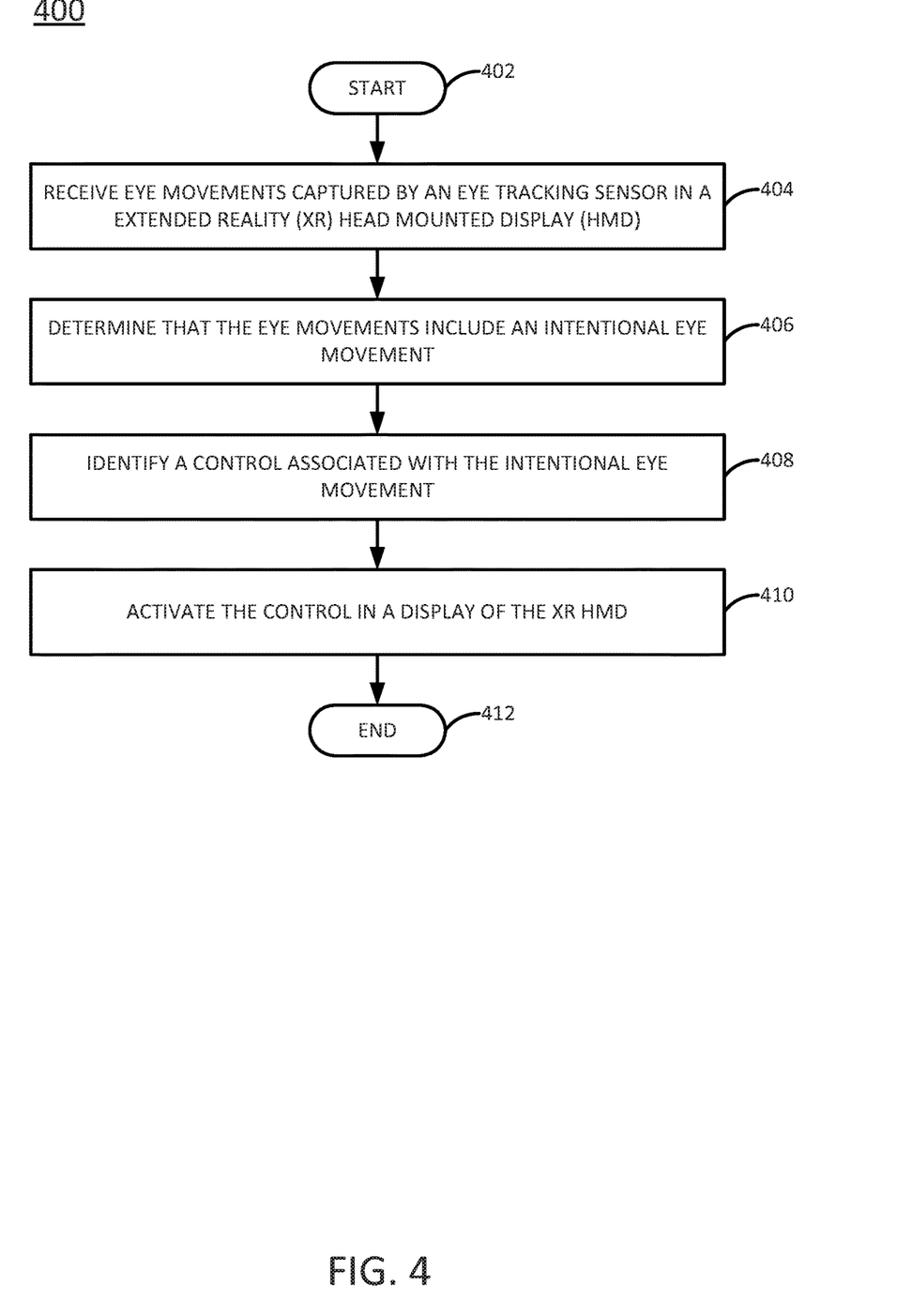
FIG. 4 is a flow chart of an example method for controlling a XR environment with eye movements of the present disclosure.

FIG. 4 illustrates a detailed flow chart of a method for controlling a XR environment with eye movements of the present disclosure. In an example, the method 400 may be performed by the XR HMD 100, 200, or 300 illustrated in FIG. 1-3, or by the apparatus 500 illustrated in FIG. 5, and described below.

At block 402, the method 400 begins. At block 404, the method 400 receives eye movements captured by an eye tracking sensor in a XR HMD. The eye tracking sensor may be an EMG sensor located on or in a gasket that contacts a user's face when the XR HMD is worn. The eye tracking sensor may include a camera that captures movement of the muscles around the orbital bone of the eyes of the user. The eye movements may be recorded and provided to the processor for analysis.

At block 406, the method 400 determines that the eye movements include an intentional eye movement. In one example, the eye movement may be an intentional blink. The intentional blink may be distinguished from an unintentional blink when certain muscles around the eyes of the user are activated. When the movement of the muscles around the eyes of the user is detected from the captured eye movements, the method may determine that the eye movement was an intentional eye movement, such as an intentional blink.

As noted above, the intentional eye movement may also include other types of intentional eye movements. For example, the intentional eye movement may also include raising or lowering of an eyebrow, closing an eye, winking, and the like. In one example, the intentional eye movement may include a series of eye movements. For example, the user may blink in a predefined pattern or sequence. For example, the user may blink for a predefined number of times (e.g., 3 consecutive intentional blinks), the user may close the left eye, then close the right eye, then blink with both eyes for a predefined time period, may blink rapidly for several seconds, may perform a pattern of eye brow raises and intentional blinks, and so forth.

At block 408, the method 400 identifies a control associated with the intentional eye movement. In one example, the intentional eye movement may be an intentional blink to toggle between a VR mode and an AR mode for the pass-through display of the XR HMD. For example, a VR/AR toggle control may be associated with an intentional blink.

However, other controls may also be associated with other types of intentional eye movements. For example, raising and lowering the eyebrows can be used to scroll up and down a menu, blinking for a predetermined amount of time may be used to display a menu on the display, blinking rapidly for 5 seconds can be used to restart the XR applications, closing a left eye or closing a right eye can be used to scroll left and right in a menu, blinking twice within a predefined period of time may be used to make a selection, and so forth. It should be noted that the combinations of eye movements and controls described above are provided as examples and that the eye movements can be associated with other controls or different combinations of eye movements and controls may be possible.

At block 410, the method 400 activates the control in a display of the XR HMD. For example, if the intentional eye movement was an intentional blink to toggle between the VR and AR mode, the method 400 may switch the VR screen to an AR pass-through screen. If the intentional eye movement was a different type of intentional eye movement, then the associated control may be activated in the XR HMD. As noted above, the intentional eye movements may be used to control the XR application executed by the XR HMD. At block 412, the method 400 ends.

Figure 5:
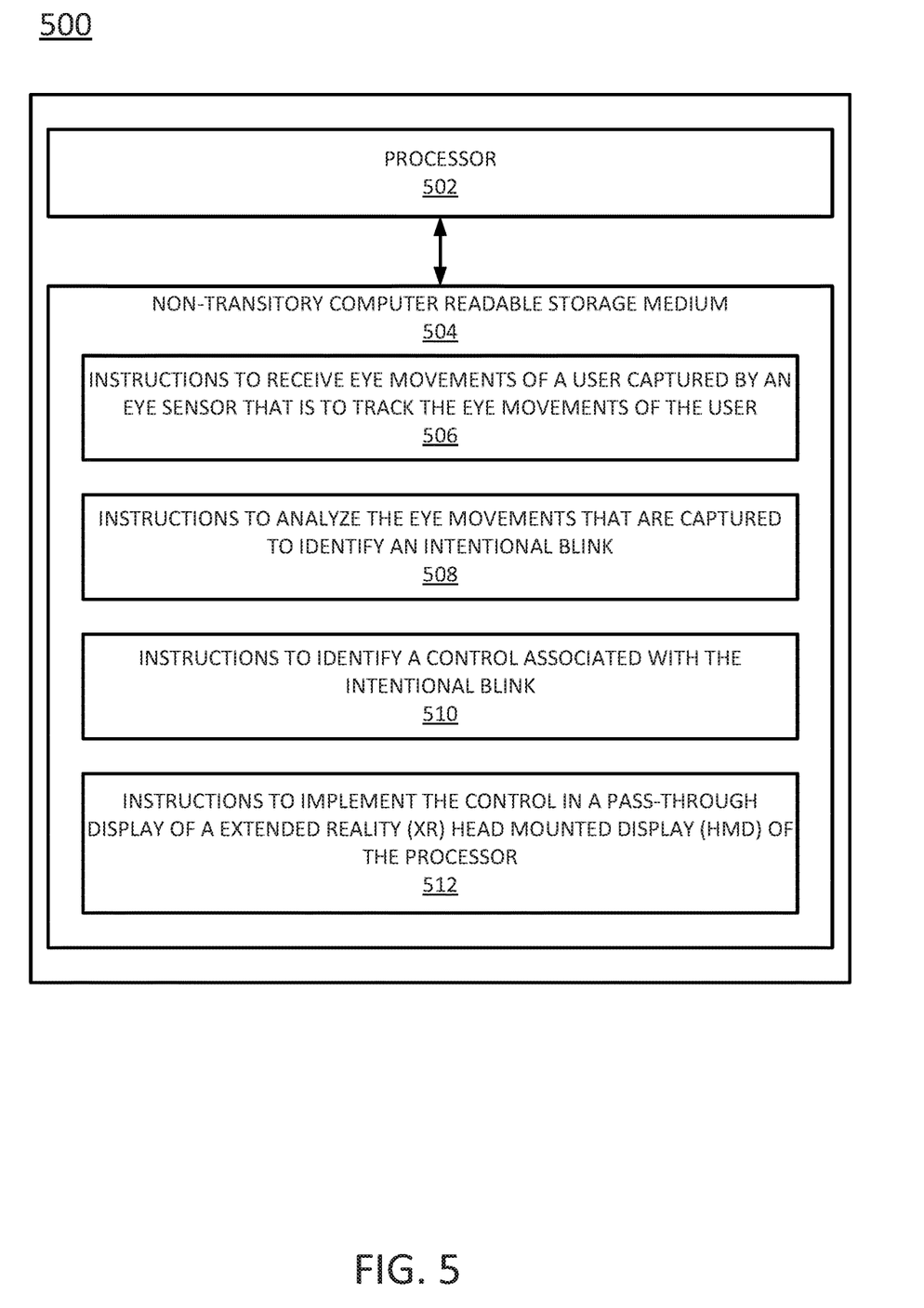
FIG. 5 is a block diagram of an example non-transitory computer readable storage medium storing instructions executed by a processor to control a XR environment with eye movements of the present disclosure.

FIG. 5 illustrates an example of an apparatus 500. In an example, the apparatus 500 may be the XR HMD 100, 200, or 300. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include instructions to receive eye movements of a user captured by an eye sensor that is to track the eye movements of the user. The instructions 508 may include instructions to analyze the eye movements that are captured to identify an intentional blink. The instructions 510 may include instructions to identify a control associated with the intentional blink. The instructions 512 may include instructions to implement the control in a pass-through display of an extended reality (XR) head mounted display (HMD) of the processor.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An extended reality (XR) head mounted display (HMD), comprising:
    a display comprising a pass-through display to support a virtual reality (VR) mode and an augmented reality (AR) mode;
    an eye tracking sensor to capture eye movements of a user; and
    a processor in communication with the display and the eye tracking sensor, wherein the processor is to identify a type of intentional eye movement from the eye movements captured by the eye tracking sensor and activate a control that is shown in the display.

2. The XR HMD of claim 1, wherein the eye tracking sensor comprises an electromyography (EMG) sensor to detect muscle movement.

3. The XR HMD of claim 2, further comprising:
    a gasket around the XR HMD that rests on a face of a user around eyes of the user, wherein the EMG sensor is located in the gasket.

4. The XR HMD of claim 1, wherein the eye tracking sensor comprises a video camera to capture video images of the eye movements of the user.

5. The XR HMD of claim 1, wherein the intentional eye movement comprises an intentional blink.

6. The XR HMD of claim 5, wherein the processor is to identify the intentional blink when the eye movements captured by the eye tracking sensor indicate activation of muscles around an eye socket of the user.

7. The XR HMD of claim 5, wherein the intentional blink is to toggle between the VR mode and the AR mode of the pass-through display.

8. A method, comprising:
    receiving, by a processor, eye movements captured by an eye tracking sensor in a extended reality (XR) head mounted display (HMD), wherein the XR HMD supports a virtual reality (VR) mode and an augmented reality (AR) mode;
    determining, by the processor, that the eye movements include an intentional eye movement;
    identifying, by the processor, a control associated with the intentional eye movement; and
    activating, by the processor, the control in a display of the XR HMD.

9. The method of claim 8, wherein the determining comprises:
    detecting, by the processor, movement of muscles around an eye socket of a user.

10. The method of claim 8, wherein the intentional eye movement comprises at least one of: an intentional blink or a movement of an eyebrow.

11. The method of claim 10, wherein the intentional eye movement comprises the intentional blink for a predefined duration, a sequence of intentional blinks, or the intentional blink with a left eye or a right eye.

12. The method of claim 10, wherein the intentional eye movement comprises rising of the eyebrow or lowering of the eyebrow.

13. The method of claim 8, wherein the control associated with the intentional eye movement comprises at least one of: toggling between the VR mode and the AR mode of the display, displaying a menu, moving a cursor within the menu, or making a selection within the menu.

14. A non-transitory computer readable storage medium encoded with instructions executable by a processor, the non-transitory computer-readable storage medium comprising:
    instructions to receive eye movements of a user captured by an eye sensor that is to track the eye movements of the user;
    instructions to analyze the eye movements that are captured to identify an intentional blink;
    instructions to identify a control associated with the intentional blink; and
    instructions to implement the control in a pass-through display of a extended reality (XR) head mounted display (HMD) of the processor, wherein the pass-through display of the XR HMD is to support an augmented reality (AR) mode and a virtual reality (VR) mode.

15. The non-transitory computer readable storage medium of claim 14, wherein the eye movements comprise electrical signals measured by an electromyography sensor.

16. The non-transitory computer readable storage medium of claim 14, wherein the instructions to implement the control include instructions to toggle between the AR mode and the VR mode.

* * * * *